United States Patent [19]

Hanulik

[11] Patent Number: 4,874,486
[45] Date of Patent: Oct. 17, 1989

[54] PROCESS FOR THE RECYCLING OF ELECTRICAL BATTERIES, ASSEMBLED PRINTED CIRCUIT BOARDS AND ELECTRONIC COMPONENTS

[75] Inventor: Jozef Hanulik, Zurich, Switzerland
[73] Assignee: RecyTec S.A., Switzerland
[21] Appl. No.: 128,398
[22] Filed: Dec. 3, 1987

[30] Foreign Application Priority Data

Dec. 12, 1986 [CH] Switzerland ............... 4960/86

[51] Int. Cl.[4] .................................. C25F 5/00
[52] U.S. Cl. .............................. 204/140; 204/146
[58] Field of Search ............. 204/105 R, 109, 111, 204/130, 140, 146

[56] References Cited

FOREIGN PATENT DOCUMENTS 0038366 5/1984 PCT Int'l Appl. .
0069117 11/1985 PCT Int'l Appl. .

Primary Examiner—T. M. Tufariello
Attorney, Agent, or Firm—Kane, Dalsimer, Sullivan, Kurucz, Levy, Eisele and Richard

[57] ABSTRACT

For the recycling of electrical batteries, in particular of a mixture of high-power batteries for equipment of any chemical composition, and also of assembled printed circuit boards and electronic components, a pyrolysis of the unsorted mixture is carried out at a temperature between 450° and 650° C., then an electrolysis of the pyrolysis slag is carried out and subsequently a separation of the electrolysis products and removal of the products accumulating at the electrodes is carried out.

In this process, which is economically profitable, no environment-polluting residues are produced and an initial sorting of material becomes unnecessary.

13 Claims, 1 Drawing Sheet 4,874,486

PROCESS FOR THE RECYCLING OF ELECTRICAL BATTERIES, ASSEMBLED PRINTED CIRCUIT BOARDS AND ELECTRONIC COMPONENTS

FIELD OF THE INVENTION

The invention relates to the recycling of electrical batteries, in particular of a mixture of high-power batteries for equipment of any construction, size and chemical composition, and also of assembled printed circuit boards and electronic components.

The problem of environmental pollution by used electrical batteries, in particular high-power batteries for equipment, has been known for a long time. Of the 5,000 tons of batteries marketed annually in Switzerland, for example, only about 1,000 tons per year find their way back to collection points. The remainder end up in an uncontrolled manner in dumps and refuse incineration plants.

PRIOR ART

In the known processes for recycling electrical batteries, a sorting of the returned batteries according to their content is first carried out in an initial stage. This initial stage in particular is, however, enormously expensive because it is virtually impossible to carry it out mechanically. Furthermore, in the case of batteries of similar construction and comparable appearance, the composition may be different since around 200 different battery shapes and types are obtainable on the market.

In known processes the concentration of the metals is continually being diluted by adding various chemicals at various process stages, which should, however, be avoided from the energy point of view.

Thus, in a known process undergoing laboratory trials, the batteries are sorted and subsequently chopped up mechanically. As a result of this, however, the organic components become distributed through the subsequent process stages.

In other known processes, scrap from batteries of a particular composition is processed mechanically, heated, leached out and electrolyzed (European Patent Published Specification No. 158,627, European Patent Specification No. 69,117, Belgian Patent Specification No. 894,278, Japanese Patent Specification No. 880,419). As a result of subsequent reactions a few, but valuable metal components are then recovered and residues left behind have then nevertheless still to be disposed of as waste categories presenting as few problems as possible. The question of process economy is inevitably almost completely ignored in conventional waste disposal since only political and environmental protection considerations play a part in the latter.

SUMMARY OF THE INVENTION

It is the object of the invention to provide a process by which both electrical batteries and also assembled printed circuit boards and electronic components can be recycled almost completely and which is intended, in particular, also to have the following advantages:

An initial sorting of the material to be recycled becomes unnecessary, its practical embodiment is robust and insensitive to any impurities which may be encountered, in particular no environment-polluting residues are produced and it is, in addition, also economically profitable.

This object is achieved by a process with the characterizing features of Patent claim 1.

Advantageous possible embodiments emerge from the dependent subclaims and are explained in more detail in the description below.

Information on the possible compositions of the various high-power batteries for equipment is given, for example, inter alia, in the following publications: "Gerätebatterien; Grundlagen und Theorie, sowie der aktuelle technische Stand und Entwicklungstendenzen" ("High-power Batteries for Equipment; Principles and Theory, and also the Current Technical Art and Development Tendencies") by H. A. Kiehne et al., Export Verlag GmbH, 1983, and also "Sealed Nickel Cadmium Batteries", published by Varta Batterie AG through VDI-Verlag GmbH, Düsseldorf 1982. A further discussion therefore appears unnecessary, although the knowledge emerging from the sources quoted have in any case been taken into consideration in the process according to the invention.

In a first phase of the process, a mixture of the components mentioned in the introduction as they are encountered at the collection point is pyrolyzed. Depending on the collection point, a certain preliminary sorting may have been carried out in this connection, but this plays only a subordinate role for the process according to the invention since a preliminary sorting would have an effect only on a certain improvement in the energy balance. During the pyrolysis, the volatile components of the scrap introduced into the furnace distill off. These are in this case predominantly water, carbon dioxide, carbon monoxide, hydrochloric acid, ammonium chloride and most of the mercury content, which does not evaporate off quantitatively. Said gaseous pyrolysis products can be washed out by wash columns.

The pyrolysis is carried out at temperatures between 450° C. and 650° C., predominantly at 550° C. At these temperatures, plastics, starch, organic components and paints are carbonized.

It is possible to carry out the pyrolysis in an inert gas or in a reducing atmosphere, as a result of which the oxidation of metals is prevented.

The first process step, the pyrolysis, is always intended to rid the starting materials of substances which cannot be treated further in the subsequent further processing.

BRIEF DESCRIPTION OF THE DRAWINGS

Possibilities for the practical implementation of the process according to the invention are shown diagrammatically in the accompanying drawing, in which.

DESCRIPTION OF THE PREFERRED EMBODIMENT(s)

Figure 1:
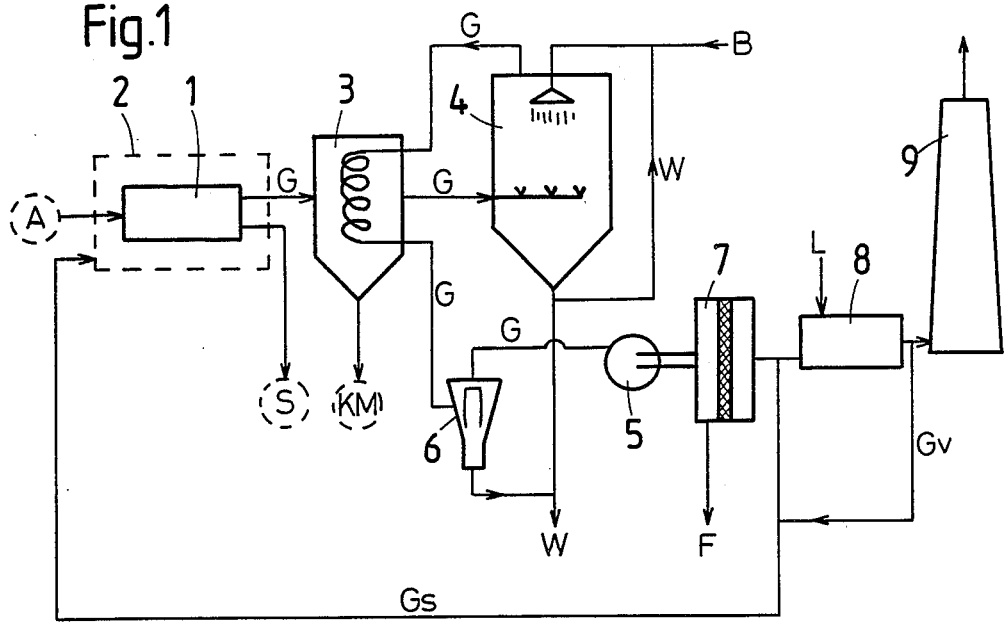
FIG. 1 shows the pyrolysis and further treatment of the gaseous reaction products produced therein and FIG. 2 shows the electrolysis.

According to this, the pyrolysis of the starting material A is carried out according to FIG. 1 in a closed furnace 1 suitable for this purpose inside which there is a reduced pressure of 20 to 50 mm Hg and which is surrounded by a casing 2. Between the outside of the furnace 1 and the casing 2, a protective gas jacket is maintained at atmospheric pressure The gaseous reaction products G produced in the pyrolysis are passed through a condenser 3 in which condensate and metal vapors KM are deposited and drained off. The gaseous constituents are then fed to a wash column 4 in which they are washed in counter-current with a 5-10% borofluoric acid B and are fed back again as coolant to the condenser 3. The wash acid W used in the wash column 4 is either fed back to the washing process or, if it is spent and also contains substantial amounts of metal fluoroborates in addition to borofluoric acid, it is used for treating the pyrolysis slags as is further described below.

The gas stream leaving the cooling equipment of the condenser 3 is extracted by a fan 5 through a cyclone separator 6, forced through a dust filter 7 and then fed to a combustion system 8 supplied with air L, from which the combustion gases escape through a chimney 9.

Upstream of the combustion system 8, a portion of the gas stream may be tapped off and fed as a reducing protective gas Gs to the jacket of the pyrolysis furnace 1, in which case it may possibly be necessary to admix combusted gases Gv in a particular proportion to the said protective gas stream in order to prevent an explosion hazard at the hot pyrolysis furnace.

The dust F from the dust filter 7 is fed together with the slag S from the pyrolysis furnace 1 to the second process stage, the electrolysis. In this process, it may be expedient to treat the pyrolysis slag beforehand with water or a dilute borofluoric wash acid W. The suspension is then filtered and the filtrate is fed to a crystallization system for the salts contained therein and the filter cake is fed to the electrolysis.

In principle two electrolysis processes are suitable for this purpose, namely electrolysis in the high-temperature range in which the pyrolysis slag is melted and the melt forms the electrolyte, or in the low temperature range, in which the pyrolysis slag is dissolved in an electrolyte. Both processes make it possible to separate the slag into the most important metals and to recover them so that, in particular, this process step is economically profitable since the production of relatively rare and expensive metals in this process is relatively large.

Figure 2:
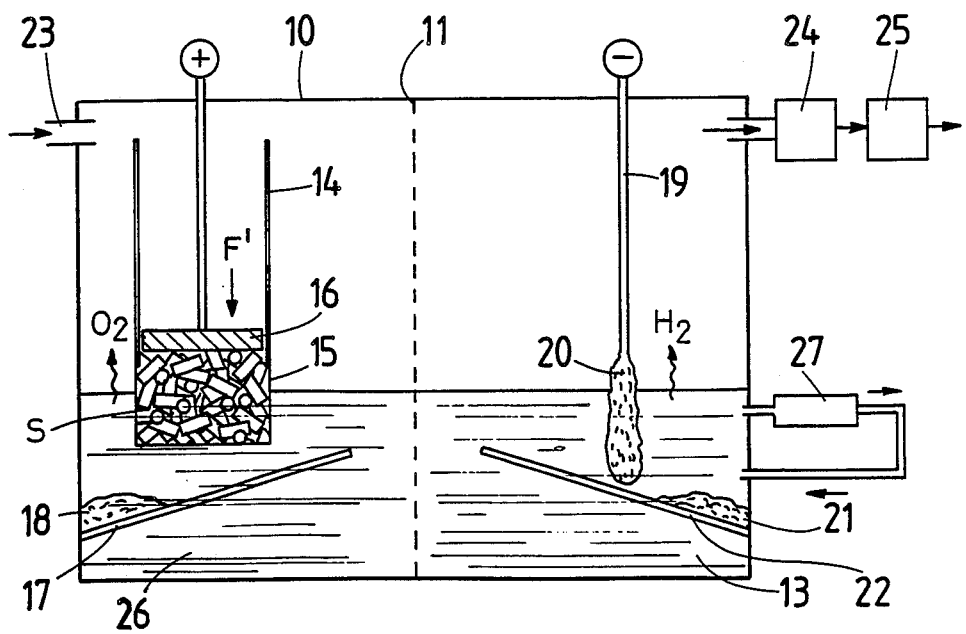

It was recognized as particularly advantageous if the electrolysis in the low-temperature range is carried out in borofluoric acid (HBF$^4$) as electrolyte. Almost all metals and their compounds are known to be soluble in borofluoric acid. This procedure is described in more detail below with reference to FIG. 2 in the drawing:

To carry out the electrolysis, the pyrolysis slag is introduced into the electrolysis cell 10 which can be completely sealed and which is subdivided by a partition 11 or a diaphragm into the anode chamber and the cathode chamber. The electrolysis solution 13 introduced into the cell 10 is, as mentioned above, in this case a borofluoric acid, preferably a 50% solution of technical quality, but in principle, other electrolytic solutions are also suitable.

The pyrolysis slag S is introduced into a plastic cylinder 14 whose lower end, which is immersed in the electrolyte, consists of a grid 15 coated with plastic. The pyrolysis slag S in the form of the unchopped batteries is pressed downwards by a metal or graphite plate 16 under a pressure F. The said plate 16 forms the anode but does not come into contact with the electrolysis solution 13, the borofluoric acid, and consequently has a long service life. Beneath the anode there is an anode chamber 17 made of plastic in which the anode sludge 18 accumulates. This mainly contains residual solids such as pulverized graphite, manganese oxide, porcelain, glass and also, in small amounts, grained mercury and sintered oxides. The processes taking place at the anode can be represented as follows:

$$Me^o - O^e \rightarrow Me^n +$$

and apply to all the metals suitable for battery manufacture. In this process, the salts of borofluoric acid are formed which are, with very few exceptions, readily soluble. In this manner, the batteries are "electrolytically decomposed" and transferred to solution. In this process some oxygen is liberated, which is desirable for the decomposition of the graphite.

The anode sludge produced may subsequently be worked up by post-treatment or delivered directly to the battery manufacturers again for reutilization.

The cathode is constructed in the form of a metal sheet 19 which is composed, for example, of iron. The following metals are deposited on it: Fe, Ni, Zn, Cd, Ag, Cu, Hg, Co, Sn, Pb and Au. No deposition of baser metals such as Al, K, Li, Na etc., however, occurs. The deposition of the more noble metals 20 takes place in metallic form on the metal cathode sheet 19 or in the cathode sludge 21 which settles in the cathode space 22 situated beneath the cathode in the form of a plastic collecting trough. Said metals are separated metallurgically or electrochemically, worked up and may then be delivered to the industry again for reutilization.

Since hydrogen and small amounts of chlorine are liberated around the cathode, it is expedient to blow in fresh air at one side of the cell by means of a fan 23 and to extract it at the opposite side of the cell so that no explosive gas mixture is produced. The extracted gas and vapor mixture is passed through a filter 24 to separate aerosols and entrained solids and is finally purified in a wash column 25. This may expediently be carried out with the wash liquid containing sodium and potassium hydroxide which has been used for the treatment of the pyrolysis slag S. In this manner chlorides present are removed from the process.

On the bottom of the cell 10, small quantities of by-products 26 are furthermore deposited such as, for example, mercury colloids and possible hydrolysis products such as HgO derived from unstable Hg(BF$_4$)$_2$ compounds.

The electrolyte may be continuously pumped through a filter system 27.

The "electrolytic decomposition" may be further accelerated by employing stirrers and ultrasonic probes which are not shown.

The voltage applied in the electrolysis may be very low. In experimental systems, voltages around +6 V were applied, but in practice it is possible to employ still lower voltages. The current density can be set at 20 to 50 A/dm$^2$.

In order to deposit 1 g of metal at the cathode, about 1 to 1.5 Ah is required, which means that the power costs are around Fr. 0.2 to 0.3 per kg of metal.

As a result of the internal resistance, the electrolyte heats up to the desired operating temperature of 40° to 80° C. At this temperature, graphite is oxidized and pulverized in borofluoric acid at the anode.

As an electrolyte, borofluoric acid has a solubility capacity, depending on the metal, of 200 to 400 g metal/l.

The profitability of the process according to the invention includes also the possibility of regenerating the borofluoric acid used as electrolyte. Such a regeneration is first carried out in the electrolysis cell itself by the deposition of metals whose ions are in solution in the electrolyte so that no burden is placed on the acid balance of the process.

The metals which are not deposited because of their electrochemical properties in the acid medium, such as aluminum, potassium, lithium and sodium may be removed as soon as crystallization appears, by a deposition of sodium, potassium and lithium metals on an amalgam cathode because of the high concentration of fluoroborates. The metals accumulating at the amalgam cathode can be separated without difficulty.

In time, however, still further impurities accumulate in the electrolyte such as various fluroborates and trace elements. The electrolyte can then be regenerated in a simple manner by distillation, which is carried out in vacuo so that the borofluoric acid does not decompose thermally. The metal fluoroborates accumulating in the bottom during the distillation may then be pyrolyzed at about 150° C., the corresponding fluorides being produced. Borontrifluoride gas is also liberated which is soluble in water and which can be converted into borofluoric acid again by adding hydrofluoric acid which is then fed back again to the electrolysis process.

The pyrolysis products from the distillation bottom and the fluorides of the metals can be separated from each other also by fractional distillation and delivered to the industry for reutilization.

The process has the great advantage that, with a technically $simple procedure, all the components of electrical batteries, assembled printed circuit boards and electronic components can be recovered without environment-polluting residues being produced and having to be disposed of. The necessary reagents can be reused in a closed cycle.

The process according to the invention is therefore not only ecologically extremely valuable in its application because a disposal of products hazardous to the environment is unnecessary, but is also profitable because the starting products, namely used batteries, old electronic components and assembled defective printed circuit boards accumulate free of charge and the valuable metals contained in relatively high concentrations can be recovered with economy of energy and because semi-finished products are produced which can be reutilized in the industry. The process functions energetically and financially very economically since the high concentration of the metals is maintained throughout the entire process and no dilution takes place which would lead to an appreciable increase in the entropy.

As a result of the fact that, in the application of the process according to the invention, a complete decomposition of the materials processed and a recovery of all the important constituents are made possible, there is moreover the advantage that now waste products, which were hitherto regarded as more or less worthless, have recently proved to be a valuable source of raw materials which otherwise had only to be imported from third party countries.

I claim:

1. A process for the recycling of electrical batteries for equipment of any chemical composition, and of assembled printed circuit boards and electronic components, the starting materials being heated and metals present in the residue being electrolytically deposited, wherein:
    (a) a pyrolysis of the unsorted mixture is carried out in a closed furnace at a temperature between 450° C. and 650° C.;
    (b) the pyrolysis slag is treated with water or with forofluoric wash acid diluted with water and filtered;
    (c) the filter cake is dissolved in borofluoric acid solution;
    (d) said borofluoric acid solution is used as an electrolyte for carrying out an electrolysis of the dissolved pyrolysis slag in a low-temperature range;
    (e) a separation of the anode sludge and the cathode sludge accumulating under both electrodes is carried out, and these sludges are treated for reutilization of the resulting products.

2. The process as claimed in claim 1, wherein the gaseous pyrolysis products are first passed through a condenser, then washed in countercurrent with 5–10% borofluoric acid and returned to the condenser as coolant, are subsequently extracted through a cyclone separator and dust filter and finally combusted with air.

3. The process as claimed in claim 1, wherein the electrolysis of the pyrolysis slag is carried out in a solution of the electrolyte.

4. The process as claimed in claim 3, wherein the metals accumulating in the cathode space during the electrolysis are separated metallurgically, electrochemically or chemically, after which they can be supplied for a reutilization.

5. The process as claimed in claim 3, wherein the sludge accumulating in the anode space during the electrolysis is separated off and can be supplied to the battery manufacturer for reutilization.

6. The process as claimed in claim 1, wherein, to regenerate the electrolyte used during the electrolysis, the substances dissolved therein are crystallized out and separated off.

7. The process as claimed in claim 1, wherein the borofluoric acid solution is regenerated by distillation and the regenerated borofluoric acid is reused as an electrolyte solvent and wherein the bottom products developed during said distillation are converted by pyrolysis into fluorides which can be supplied to the industry for reutilization.

8. Process according the claim 1, wherein the filtrated collected according to claim 1 (b) is supplied to a filtrated system to recover the salts present therein.

9. The process as claimed in claim I, wherein the anode is not directly in contact with the electrolyte but only by means of the material of the filter cake.

10. The process as claimed in claim 1, wherein the metals accumulating in the cathode space during the electrolysis are separated metallurgically, electrochemically or chemically, after which they can be supplied for reutilization, and wherein the sludge accumulating in the anode space during the electrolysis is separated off and can be supplied to the battery manufacturer for reutilization.

11. The process as claimed in claim 10, wherein the base metals dissolved in the electrolyte during the electrolysis are separated continuously or batchwise at a mercury cathode as amalgams.

12. The process as claimed in claim 10, wherein the anode sludge accumulating during the electrolysis is treated with borofluoric acid to separate off metal traces and the undissolved residue which may then be supplied to the battery manufacturer for reutilization is filtered off.

13. The process as claimed in claim 1, wherein the electrolyte solution is kept at an operating temperature between 40° C. and 80° C. during the electrolysis, and the current density is set at 20 to 50 A/dm$^2$.

* * * * *